G. W. WACKER.
RUNNING GEAR.
APPLICATION FILED AUG. 20, 1920.
1,377,948.
Patented May 10, 1921.
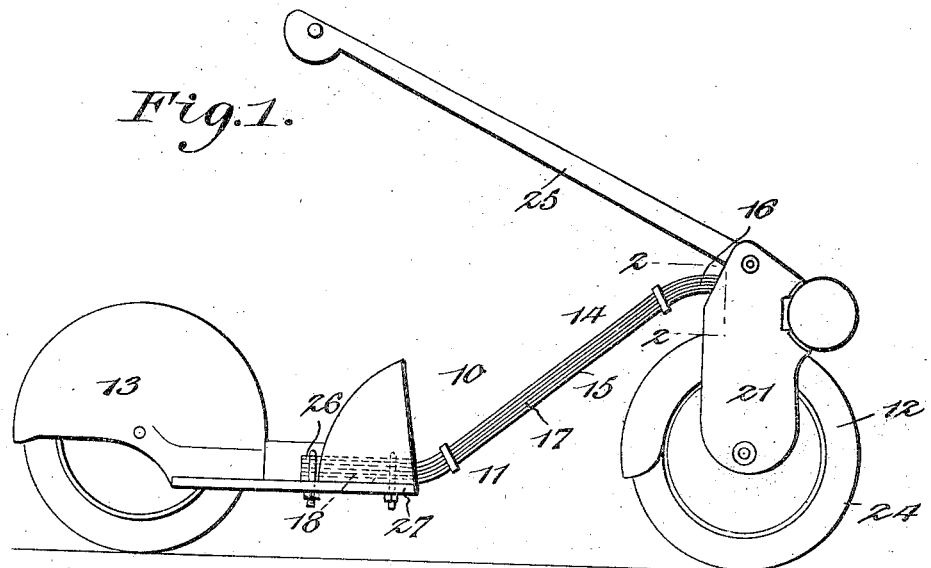
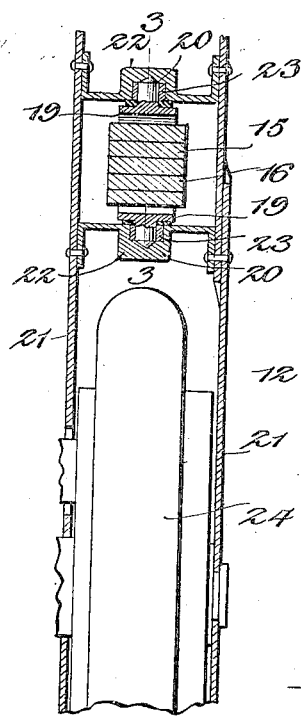
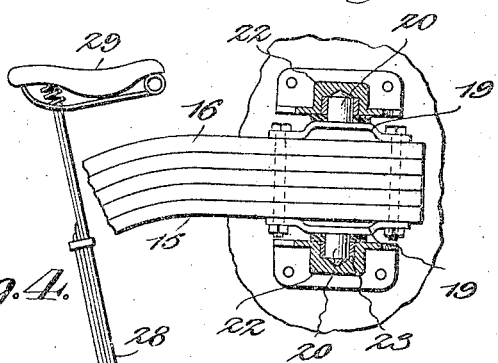
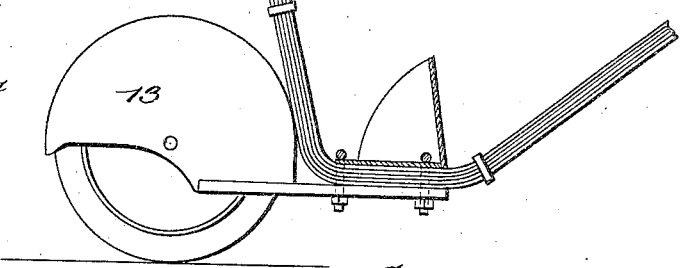
George W. Wacker,
INVENTOR
BY Victor J. Evans
ATTORNEY

UNITED STATES PATENT OFFICE.

GEORGE W. WACKER, OF RUTHERFORD, NEW JERSEY.

RUNNING-GEAR.

1,377,948.　　　　　Specification of Letters Patent.　　Patented May 10, 1921.

Application filed August 20, 1920. Serial No. 404,768.

*To all whom it may concern:*

Be it known that I, GEORGE W. WACKER, a citizen of the United States, residing at Rutherford, in the county of Bergen and State of New Jersey, have invented new and useful Improvements in Running-Gears, of which the following is a specification.

This invention relates to running gears for vehicles.

More particularly the invention relates to the reach connecting the front and rear road-wheel mountings of the running gear of a motor-driven vehicle, such as an auto-scooter, auto-ped, and the like.

Some of the objects of this invention are: to provide a plain, simple and inexpensive reach as a part of the running gear of the vehicle, which will absorb all incidental strains and stresses, and which will eliminate all incidental shocks and jars with thorough efficiency, and which will render the vehicle easy-riding; to provide a composite flexible reach as a part of the running gear of a vehicle, which is interposed between the front and rear road-wheel mountings thereof, the reach being rigidly connected to the rear mounting, and connected to the front mounting in a maner to permit the front mounting to be moved bodily with relation to the reach. With these and other objects in view the present invention resides in the particular provision and arrangement of parts hereinafter more fully described and illustrated in the accompanying drawing, in which:

Figure 1 is a side elevation of a motor-driven scooter type of vehicle embodying the present invention.

Fig. 2 is a transverse sectional view on the line 2—2 of Fig. 1.

Fig. 3 is a detail sectional view on the line 3—3 of Fig. 2.

Fig. 4 is a fragmentary elevation illustrating a modification of the reach.

Referring now to the drawing it will be seen that, a vehicle 10 of the scooter-type has been shown, the same being motor-driven. This vehicle is constructed to include a running gear 11 which comprises a front road-wheel mounting 12, a rear road-wheel mounting 13, and a reach 14 which is interposed between the said mountings.

As shown in Fig. 1 the reach 14 consists of an element composed of a plurality of flat spring members 15, thus producing a reach with flexibility. The reach is made to provide differently and relatively disposed portions 16, 17 and 18. As forming a part of the running gear, the portions 16 and 18 of the reach will be substantially horizontally disposed, whereas the portion 17 will be disposed obliquely. Under such disposition of the portions of the reach, the greatest degree of flexibility may be obtained to properly sustain the weight to be carried, and to absorb all incidental strains and stresses. The end of the portion 16 is equipped with members 19 and each of said members being provided with a stub shaft 20. The front mounting 12 includes in its construction spaced side members 21. Bearings 22 are secured to the members 21. The bearings have brasses 23 in which the shafts 20 are journaled. The shafts 20 are in vertical alinement with the longitudinal axis of the front wheel 24. It will now be obvious that the front mounting may be moved with relation to the reach 14. A steering member 25 is secured to the members 21. The portion 18 of the reach is fixedly secured as at 26 to the platform 27 forming a part of the rear mounting 13, thus holding the rear mounting rigid with respect to the reach.

As shown in Fig. 4, the reach is made to have an upwardly extending portion 28, and this portion supports a saddle 29, to provide a seat for the driver of the vehicle. It will be obvious that the saddle 29 is yieldingly supported in spite of the fact that the reach is in one piece and that it is rigidly secured to the platform of the rear mounting 13.

What is claimed is:

1. In an auto-ped, a turnable front road-wheel mounting, a rear road-wheel mounting, a flexible reach connecting said mountings, said reach having compound flexing action to permit the front mounting to move bodily and relatively to the rear mounting, said reach being unsupported and unattached at any point between said mountings.

2. In an auto-ped, a front road-wheel mounting including bearings, a composite reach having different relatively disposed portions, a rear road-wheel mounting, the said reach being disposed between the said mountings, stub shafts embodied by the reach which are journaled in the brasses of said bearings to provide a steering connection between the front end of the reach and the front mounting.

In testimony whereof I have affixed my signature.

GEORGE W. WACKER.